Patented Feb. 3, 1931

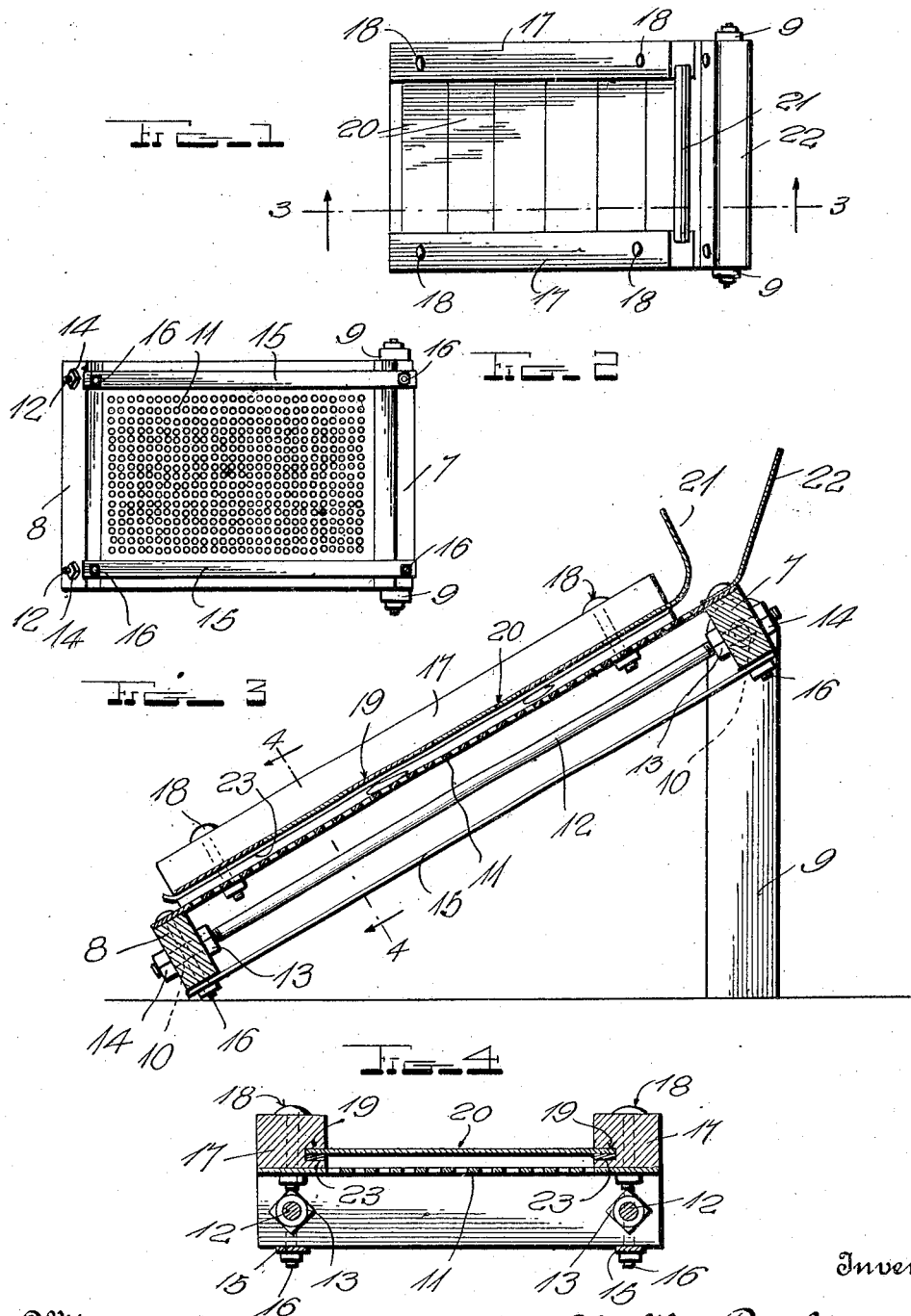

1,791,245

UNITED STATES PATENT OFFICE

WALTER PARLIAMENT, OF HAZEL, SOUTH DAKOTA

FLAX SEPARATOR

Application filed July 16, 1928. Serial No. 293,045.

The invention aims to provide a new and improved construction for a seed separator, whereby wild flax seed may be separated from the seed of larger size and better quality.

With the foregoing in view, the invention resides in the novel subject matter hereinafter described and claimed, description being accomplished by reference to the accompanying drawing.

Fig. 1 is a top plan view of a separator constructed in accordance with my invention.

Fig. 2 is a bottom plan view.

Fig. 3 is a longitudinal sectional view on line 3—3 of Fig. 1.

Fig. 4 is a transverse section on line 4—4 of Fig. 3.

The drawing above briefly described illustrates one form of construction and while such construction will be herein specifically explained, it is to be understood that within the scope of the invention as claimed, minor variations may be made.

The separator embodies a base frame having parallel upper and lower end bars 7—8 respectively, to the uppermost of which, legs 9 are suitably secured. Openings 10 are formed through the bars 7—8 in alinement with each other, said openings being disposed near the ends of said bars and between the upper and lower edges thereof. A screen 11 extends between and is secured to the upper edges of these bars, and spreader means are provided for spreading said bars to hold the screen under tension. In the present showing, two longitudinal rods 12 extend between the bars 7—8 and pass slidably through the openings 10 thereof, nuts 13 being threaded upon these rods at the inner sides of said bars, so that tightening of the nuts will spread said bars and hold the screen under such tension as to prevent sagging thereof. Preferably, lock nuts 14 are threaded upon the rods 12 in contact with the outer sides of the bars 7—8.

Tie means are provided to hold the bars 7—8 against turning about axes extending longitudinally thereof, when the nuts 13 are tightened to tension the screen 11. Preferably, this tie means consists of longitudinal metal strips or bars 15 extending between and secured to the longitudinal lower edges of the bars 7—8. Bolts 16 are shown extending through these bars, through the screen 11 and through the strips 15 for the purpose of securing all of these parts together, and as said screen is preferably in the form of a perforated plate, it will not be severely distorted by tightening of these bolts.

Two bars 17 are secured longitudinally upon the longitudinal edge portions of the screen 11, bolts 18 being shown extending through said bars and screen. The inner opposed edges of these bars 17 are formed with longitudinal grooves 19 which receive the longitudinal edges of a plate 20 and hold the latter in spaced parallel relation with the screen, the spacing being such that the large flax seeds cannot turn on end and pass through the perforations of the screen 11, but must slide on their comparatively flat sides to the lower end of the separator. The comparatively small wild seed however, may readily pass through the openings of the screen and is thus separated from the larger seed.

The upper end 21 of plate 20 is bent upwardly and co-operates with a similarly shaped plate 22 secured upon the upper end of the screen 11, in forming a hopper for guiding the mixed seed into the space between the screen 11 and the plate 20. By thus mounting the plate 20, it may be shifted upwardly or downwardly in the grooves 19 to position the upwardly bent end 21 nearer to or farther from the upwardly bent end or plate 22 of the screen, thereby varying the space between the end 21 and said plate to increase or diminish the size of the hopper and its discharge opening so that the flow or feeding of the seed to the screen may be regulated.

In the present showing, plate 20 is formed of a plurality of panels or sections disposed edge to edge and tightly held in the grooves 19, by longitudinal strips 23 disposed in said grooves. These strips may either be positioned under or over the plate 20, permitting the space between this plate and the screen 11 to be slightly varied, according to the size of the seed which must pass without upright turning through said space. By forming the plate 20 in a plurality of panels or sections, the latter may be separated or pushed apart at any desired place by sliding the top section of the plate upwardly thereby giving access to the screen between the separated sections wherever needed for the removal of any obstructions or accumulations of foreign matter which may be found to be clogging the screen, thus obviating the removal of the plate from the grooves 19 for cleaning the screen.

From the foregoing, taken in connection with the accompanying drawing, it will be seen that I have provided a construction which is simple and inexpensive, yet will be efficient and in every way desirable. On account of the existing advantages for the details disclosed, they are preferably followed. However, as above stated, variations may be made within the scope of the invention as claimed.

I claim:—

A seed separator comprising a frame, a screen mounted on said frame, said screen having on one end an imperforate upwardly turned plate which forms one side of a hopper, two longitudinal bars secured upon the longitudinal edge portions of the screen, and having longitudinal grooves in their opposed edges, a plate parallel with and spaced above said screen, said plate having its edges slidably engaged with said grooves and having one end turned upwardly for co-operation with the upwardly turned plate on the end of said screen to form said hopper, and whereby the size of the hopper and its discharge opening may be varied and the flow of the seed therefrom thereby regulated, upon sliding said spaced plate upwardly or downwardly in said grooves to bring the upwardly turned end thereof nearer to or farther from the upwardly turned plate on the end of the screen.

In testimony whereof I have hereunto affixed my signature.

WALTER PARLIAMENT.